(12) United States Patent
Hong et al.

(10) Patent No.: US 7,677,756 B2
(45) Date of Patent: Mar. 16, 2010

(54) BACKLIGHT MODULE

(75) Inventors: Hong-Jye Hong, Hsinchu (TW);
Yung-Tse Cheng, Hsinchu (TW);
Chia-Hung Sun, Hsinchu (TW);
Tsung-Shiun Lee, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 11/949,774

(22) Filed: Dec. 4, 2007

(65) Prior Publication Data
US 2009/0009992 A1 Jan. 8, 2009

(30) Foreign Application Priority Data
Jul. 2, 2007 (TW) .............................. 96124008 A

(51) Int. Cl.
*F21S 4/00* (2006.01)
(52) U.S. Cl. .................. 362/221; 362/614; 362/611; 362/613; 362/630; 362/631
(58) Field of Classification Search ................. 362/221, 362/600–634
See application file for complete search history.

(56) References Cited

U.S. PATENT DOCUMENTS

| | | | | |
|---|---|---|---|---|
| 7,038,397 B2 * | 5/2006 | Komatsu et al. | ............ | 315/276 |
| 7,142,264 B2 * | 11/2006 | Choi et al. | .................... | 349/58 |
| 7,438,442 B2 * | 10/2008 | Lee et al. | ..................... | 362/295 |
| 7,527,406 B2 * | 5/2009 | Kwon et al. | ................. | 362/561 |
| 2005/0128376 A1 | 6/2005 | Li et al. | | |
| 2006/0083026 A1 | 4/2006 | Fan et al. | | |
| 2007/0093165 A1 * | 4/2007 | Komatsu et al. | .............. | 445/23 |
| 2007/0145910 A1 * | 6/2007 | Lin | ............................ | 315/274 |

FOREIGN PATENT DOCUMENTS

| | | |
|---|---|---|
| CN | 1573464 | 2/2005 |
| CN | 1702515 | 11/2005 |
| CN | 1811565 | 8/2006 |
| JP | 2003-178604 | 6/2003 |
| JP | 2007-109492 | 4/2007 |
| TW | 594223 | 6/2004 |
| TW | I275426 | 3/2007 |

* cited by examiner

*Primary Examiner*—Sandra L O'Shea
*Assistant Examiner*—Jessica L McMillan
(74) *Attorney, Agent, or Firm*—Jianq Chyun IP Office

(57) ABSTRACT

A backlight module including a plurality of lamps, a first circuit board, and a second circuit board is provided. Each lamp has a first electrode and a second electrode. The first circuit board has a plurality of first openings and first conductive clips. The first electrode is disposed to extend through the first opening and to be clamped by the first conductive clip. Furthermore, a plurality of current adjustment devices is disposed on the first circuit board. The current adjustment device is electrically coupled to the first electrode through the first conductive clips. In the backlight module, the conductive clips or clamping pins of the current adjustment devices are used to hold the electrodes of lamps, thereby facilitating the assembly process of backlight module.

32 Claims, 11 Drawing Sheets

BACKLIGHT MODULE

CROSS-REFERENCE TO RELATED APPLICATION

This application claims the priority benefit of Taiwan application serial no. 96124008, filed on Jul. 2, 2007. The entirety of the above-mentioned patent application is hereby incorporated by reference herein and made a part of this specification.

BACKGROUND OF THE INVENTION

1. Field of the Invention

The present invention relates to a backlight module, and more particularly, to a backlight module in which conductive clips or clamping pins of current adjustment devices are employed to hold electrodes of lamps.

2. Description of Related Art

With liquid crystal displays (LCDs) being increasingly widely used in applications in daily life, stability of the optical performance and light and low profile industrial design of the LCDs are becoming increasingly important. Cold cathode fluorescent lamps (CCFLs) are usually used as the backlight source of the LCD. As the size of the LCD is getting larger, the number of the lamps used is increased. Accordingly, a technology of using multiple paralleled lamps (e.g., the lamps are arranged in parallel with each other) has been developed.

However, due to variations inherent among the lamps and variations of leakage currents of the lamps due to difference in lamps arrangement, the current flowing through each lamp varies accordingly, causing non-uniform brightness of the LCD panel (i.e., it is darker in some area, but is brighter in some other area). Therefore, controlling the current balance among the lamps is critical in achieving good image quality of the LCD.

In addition, conventional LCDs usually include an inverter system disposed on the back bezel of a backlight module, resulting in a large size of the backlight module. However, to reduce cost and make the product thinner, the inverter system may be disposed on one side of the backlight module, or the number of printed circuit boards of the inverter system may be reduced, or the volume of components of the inverter system may be reduced. Therefore, configuration of the light source and inverter system is also critical in achieving good image quality of the LCD.

FIG. 1 illustrates a conventional backlight module. Referring to FIG. 1, the conventional backlight module 100 includes a plurality of straight lamps 110, a first circuit board 120, a plurality of transformer coils 102 and a second circuit board 130. Each lamp 110 includes two lamp electrodes 111 at two ends, respectively. The first circuit board 120 is disposed on the lamp electrodes at one side, and each lamp electrode 111 is electrically coupled to the first circuit board 120. In addition, transformer coils 102 are positioned on the first circuit board 120 to provide suitable drive voltage for driving the lamps 110. The second circuit board 130 is disposed on the lamp electrodes 111 at another side, and each lamp electrode 111 is electrically coupled to the second circuit board 130. It can be seen from the above description that the backlight module 100 has no mechanism to adjust luminance uniformity of the straight lamps 110, and includes many transformers, which is adverse to reducing of number and volume of the components on the circuit board.

FIG. 2 is a perspective view of another conventional backlight module. Referring to FIG. 2, the conventional backlight module 200 includes a reflective plate 240, a plurality of lamps 210, a first circuit board 220, and a second circuit board 230. The lamps 210 are disposed above the reflective plate 240 and each lamp 210 includes electrodes 211 at two ends. The first circuit board 220 and the second circuit board 230 are disposed on the two ends of the lamps 210, with the electrodes 211 of the lamps being electrically coupled to the first circuit board 220 and the second circuit board 230, respectively. At least one power supply terminal 221 is disposed on the first circuit board 220 and the second circuit board 230.

As described above, features of the two conventional backlight modules are similar, and neither of their configurations takes the method of controlling current uniformity of the lamps into account, which is disadvantageous in achieving high brightness uniformity and image quality of the LCD. Furthermore, the lamps are directly coupled to the circuit boards. In assembly, the lamps need to be coupled to the circuit boards by, for example, soldering. This may be a hindrance to simplifying the assembly process of the backlight module. In addition, poor connection may occur during the assembly of the backlight module, which affects the yield rate and finally results in a rise of the manufacturing cost.

SUMMARY OF THE INVENTION

Accordingly, the present invention is directed to a backlight module which employs conductive clips to hold electrodes of lamps, thereby facilitating assembly process of the backlight module.

The present invention is also directed to a backlight module which employs clamping pins of current adjustment devices to hold electrodes of lamps, thereby facilitating assembly process of the backlight module.

The present invention provides a backlight module. The backlight module includes a plurality of lamps, a first circuit board and a second circuit board. Each lamp includes a first electrode and a second electrode. The first circuit board includes a plurality of first conductive clips clamping the first electrodes. In addition, the second circuit board is electrically coupled to the second electrodes and the first circuit board.

According to one embodiment of the present invention, the lamps extend in parallel with each other.

According to one embodiment of the present invention, the lamps comprise fluorescent lamps, and the fluorescent lamps may comprise cold cathode fluorescent lamps, hot cathode fluorescent lamps or external electrode fluorescent lamps.

According to one embodiment of the present invention, the first circuit board has a plurality of first openings, and the first electrodes clamped by the first conductive clips extend through the first openings.

According to one embodiment of the present invention, the backlight module may further include a plurality of current adjustment devices, the current adjustment devices are located on the first circuit board, and are electrically coupled to the first electrodes through the first conductive clips. In addition, the first circuit board includes a ballast circuit electrically coupled to the current adjustment devices.

According to one embodiment of the present invention, the second circuit board includes a plurality of second conductive clips clamping the second electrodes. In addition, the second circuit board has, for example, a plurality of second openings, and the second electrodes clamped by the second conductive clips extend through the second openings. As described above, the backlight module may further include a plurality of current adjustment devices, the current adjustment devices are located on the second circuit board, and are electrically coupled to the second electrodes through the second conductive clips.

According to one embodiment of the present invention, the backlight module may further include a plurality of current adjustment devices, the current adjustment devices are located on the second circuit board, and are directly electrically coupled to the second electrodes. In addition, each of the current adjustment devices includes at least one pair of clamping pins to clamp one of the second electrodes correspondingly.

According to one embodiment of the present invention, the backlight module may further include a wire, and the second circuit board is electrically coupled to the second electrodes through the wire.

According to one embodiment of the present invention, the backlight module may further include a third circuit board and a wire, the second circuit board is electrically coupled to the second electrodes through the third circuit board and the wire. The third circuit board is positioned to be substantially perpendicular or substantially parallel to a plane on which the lamps are located. In other embodiments of the present invention, the third circuit board may, for example, include a ballast circuit, and the third circuit board includes a plurality of third conductive clips clamping the second electrodes.

According to one embodiment of the present invention, the first circuit board and second circuit board may be positioned to be substantially perpendicular or substantially parallel to a plane on which the lamps are located.

According to one embodiment of the present invention, the backlight module may further include one or more optical films located above the lamps.

The present invention provides a backlight module. The backlight module includes a plurality of lamps, a first circuit board and a second circuit board. Each lamp includes a first electrode and a second electrode. The first circuit board includes a plurality of current adjustment devices, and each of the current adjustment devices has at least one pair of clamping pins to clamp one of the first electrodes correspondingly. The second circuit board is electrically coupled to the second electrodes and the first circuit board.

According to one embodiment of the present invention, the lamps extend in parallel with each other.

According to one embodiment of the present invention, the lamps comprise fluorescent lamps, and the fluorescent lamps may comprise cold cathode fluorescent lamps, hot cathode fluorescent lamps or external electrode fluorescent lamps.

According to one embodiment of the present invention, the first circuit board has a plurality of first openings, and the first electrodes clamped by the first conductive clips extend through the first openings.

According to one embodiment of the present invention, the second circuit board includes a plurality of second conductive clips clamping the second electrodes. The second circuit board has a plurality of second openings, and the second electrodes clamped by the second conductive clips extend through the second openings.

According to one embodiment of the present invention, the backlight module may further include a wire, and the second circuit board is electrically coupled to the second electrodes through the wire.

According to one embodiment of the present invention, the backlight module may further include a third circuit board and a wire. The second circuit board is electrically coupled to the second electrodes through the third circuit board and the wire.

According to one embodiment of the present invention, the third circuit board includes a ballast circuit. In addition, the third circuit board may further include a plurality of third conductive clips clamping the second electrodes.

According to one embodiment of the present invention, the first circuit board, the second circuit board and the third circuit board may be positioned to be substantially perpendicular or substantially parallel to a plane on which the lamps are located.

According to one embodiment of the present invention, the backlight module may further include one or more optical films located above the lamps.

According to one embodiment of the present invention, the first circuit board includes a ballast circuit electrically coupled to the current adjustment devices.

In comparison with conventional technologies, the present invention employs the conductive clips of the circuit board, the clamping pins of the current adjustment devices, or clamping pins of other elements to hold electrodes of the lamps, facilitating the assembly process of the backlight module, thereby reducing the manufacturing cost.

In order to make the aforementioned and other features and advantages of the present invention more comprehensible, embodiments accompanied with figures are described in detail below.

DESCRIPTION OF THE EMBODIMENTS

First Embodiment

Figure 1:
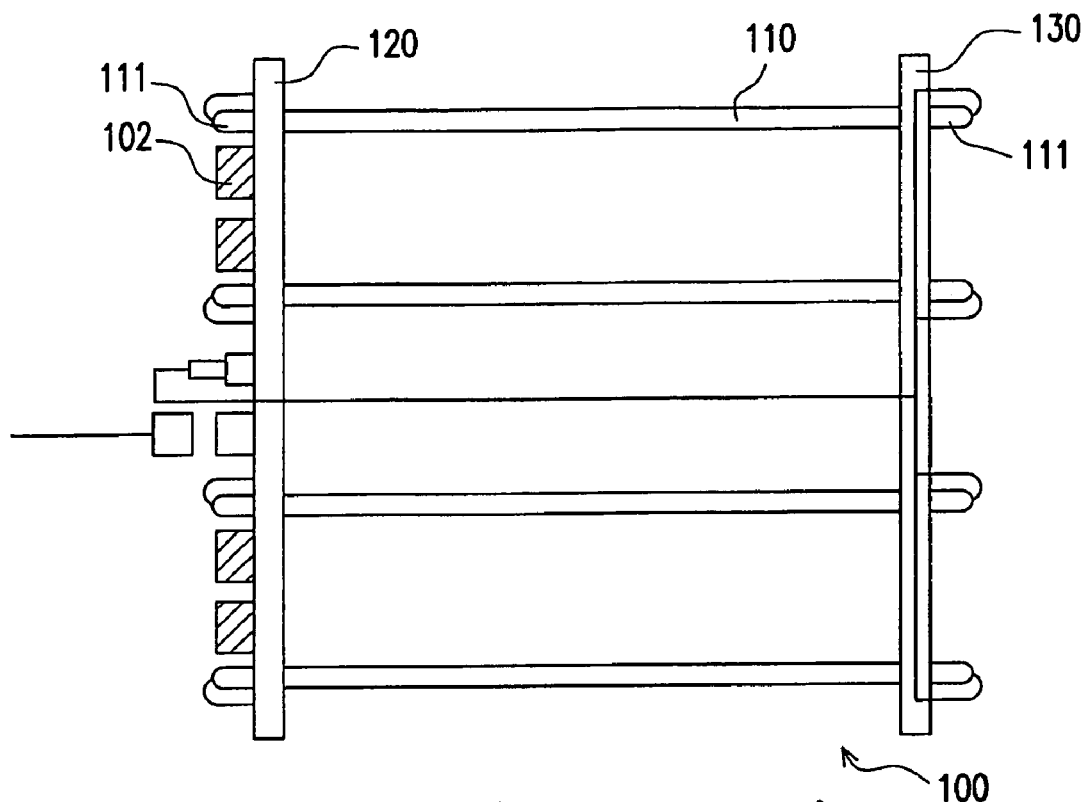
FIG. 1 illustrates a conventional backlight module.
Figure 2:
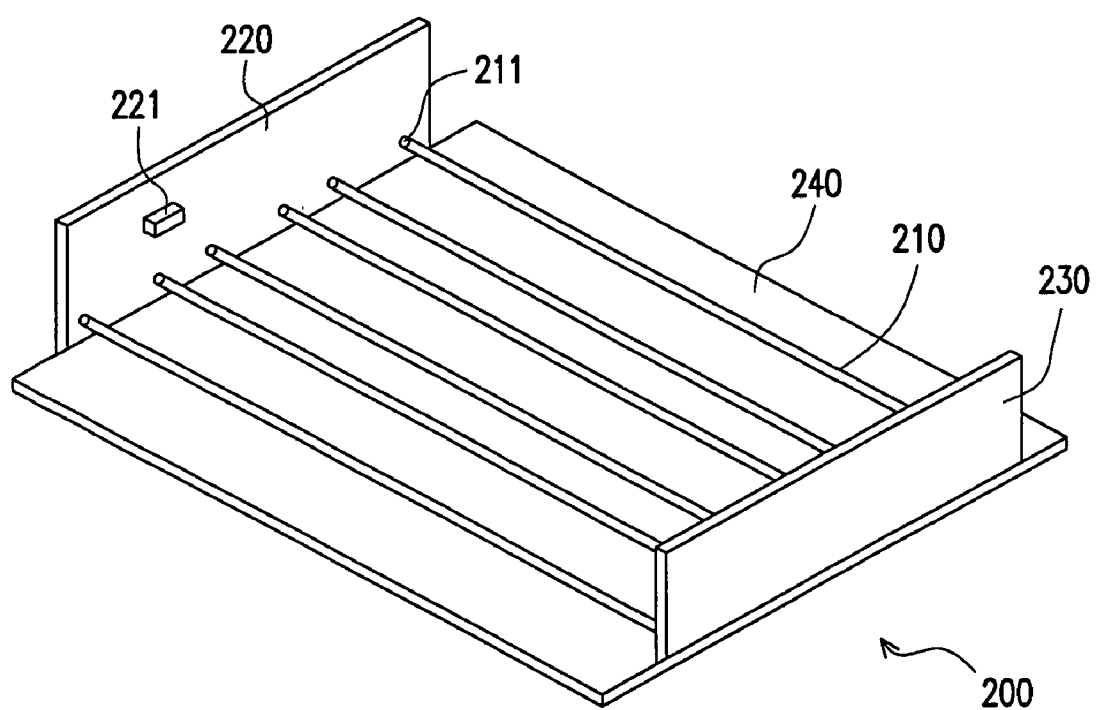
FIG. 2 is a perspective view of another conventional backlight module.
Figure 3A:
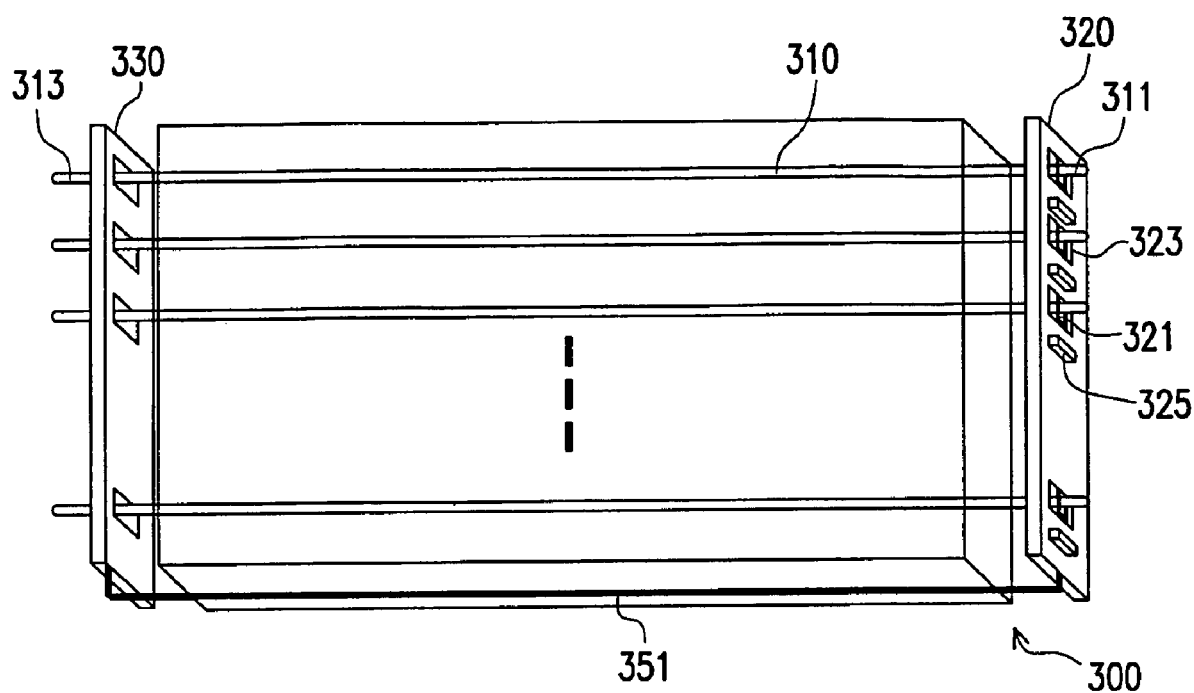
FIG. 3A is a perspective view of a backlight module in accordance with a first embodiment of the present invention.

FIG. 3A is a perspective view of a backlight module in accordance with a first embodiment of the present invention. Referring to FIG. 3A, the backlight module 300 includes a plurality of lamps 310, a first circuit board 320 and a second circuit board 330. Each lamp 310 includes a first electrode 311 and a second electrode 313. A plurality of first conductive clips 321 is disposed on the first circuit board 320 to hold the first electrodes 311. The second circuit board 330 is electrically coupled to the second electrodes 313 and the first circuit board 320. In addition, the first circuit board 320 is disposed on one side (e.g., a right side) of the backlight module 300, and the second circuit board 330 is disposed on another side (e.g., a left side) of the backlight module 300.

In this embodiment, the lamps 310 may be implemented as CCFLs, hot cathode fluorescent lamps (HCFLs) or external electrode fluorescent lamps (EEFLs), and may extend in parallel with each other. It should be understood that the lamps 310 could be of any types and the above-mentioned types of lamps 310 should not be regarded as limiting.

Figure 3B:
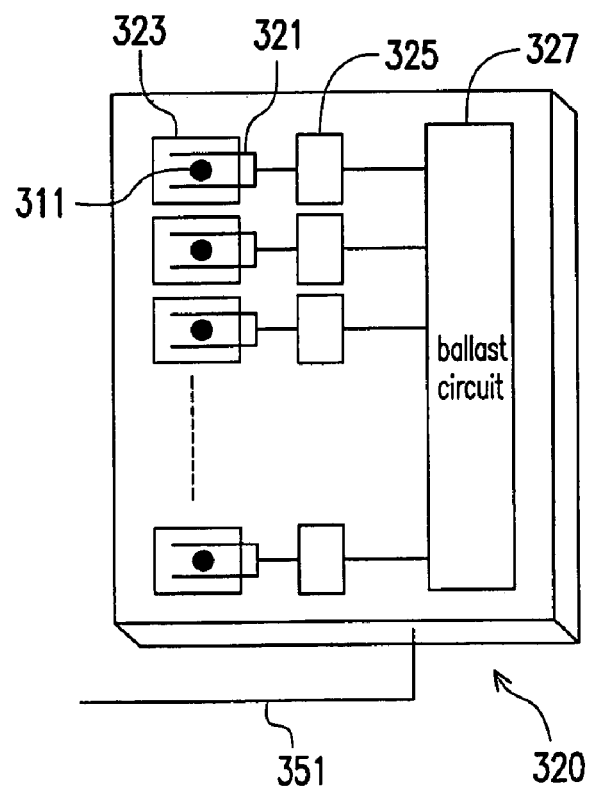
FIG. 3B illustrates the first circuit board of the backlight module shown in FIG. 3A.

FIG. 3B illustrates the first circuit board 320 of the backlight module shown in FIG. 3A. Referring to FIG. 3B, the first circuit board 320 has a plurality of openings 323 defined therein, for allowing the first electrodes to extend through the openings 323 to be held by the first conductive clips 321. Corresponding relations between the first conductive clips 321 and the first electrodes 311 held by the first conductive clips 321 may be that one of the first conductive clips 321 holds one or more of the first electrodes 311 and, the present invention is not limited to any particular corresponding relation. Specifically, the first conductive clips 321 may be modified or configured to have different shapes so that one first conductive clip 321 holds one or more first electrodes 311.

Furthermore, to increase luminance uniformity of the backlight module 300, the first circuit board 320 may further include a plurality of current adjustment devices 325 electrically coupled to the first electrodes 311 through the first conductive clips 321. Moreover, in a preferred embodiment, the first circuit board 320 includes a ballast circuit 327 electrically coupled to the current adjustment devices 325 for increasing transient impedance and stability of the lamps 310 at the moment that the lamps 310 are being ignited.

Figure 3C:
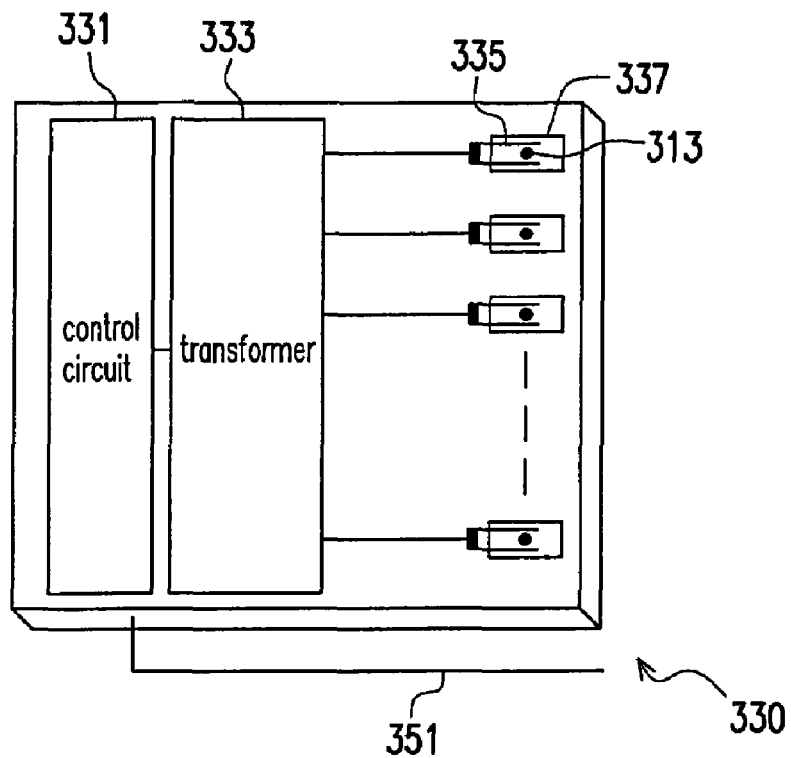
FIG. 3C is an enlarged schematic view of the second circuit board of the backlight module shown in FIG. 3A.

FIG. 3C is an enlarged schematic view of the second circuit board 330 of the backlight module shown in FIG. 3A. Referring to FIG. 3C, the second circuit board 330 includes a plurality of second conductive clips 335 and a plurality of openings 337. The second electrodes 313 extend through the second openings 337 to be held by the second conductive clips 335. Specifically, the second conductive clips 335 disposed at the second openings 337 may be H-shaped or Y-shaped conductive clips, or may be of other suitable shapes, and the above-mentioned shapes should not be regarded as limiting.

Reference to FIG. 3B and FIG. 3C, the second circuit board 330 may further include a control circuit 331 and at least one transformer 333. In addition, the backlight module 300 may further include a wire 351 through which the second circuit board 330 is electrically coupled to the first circuit board 320. Specifically, the wire 351 is coupled to the first circuit board 320 and the second circuit board 330 by, for example, soldering. Here, the transformer 333 is driven by the control circuit 331 to generate a high voltage output signal. The high voltage output signal generated by the transformer 333 is transmitted to the second electrode of the lamp 313 through the second conductive clip 335, thereby driving the lamp 310. At the same time, the control circuit 331 on the second circuit board 330 may send a voltage signal through the wire 351 to the current adjustment device 325 to control the current of the lamp 310 and adjust the luminance of the lamp 310. In other words, upon receiving the control signal of the control circuit 331, the current adjustment device 325 internally performs closed loop calculation to output a suitable current for driving the lamp 310. The inside of the current adjustment device 325 may include active or passive elements to form a desired current adjustment circuit. Furthermore, the signal sent from the control circuit 331 may be of a direct current level or a pulse width modulation (PWM) level.

Figure 3D:
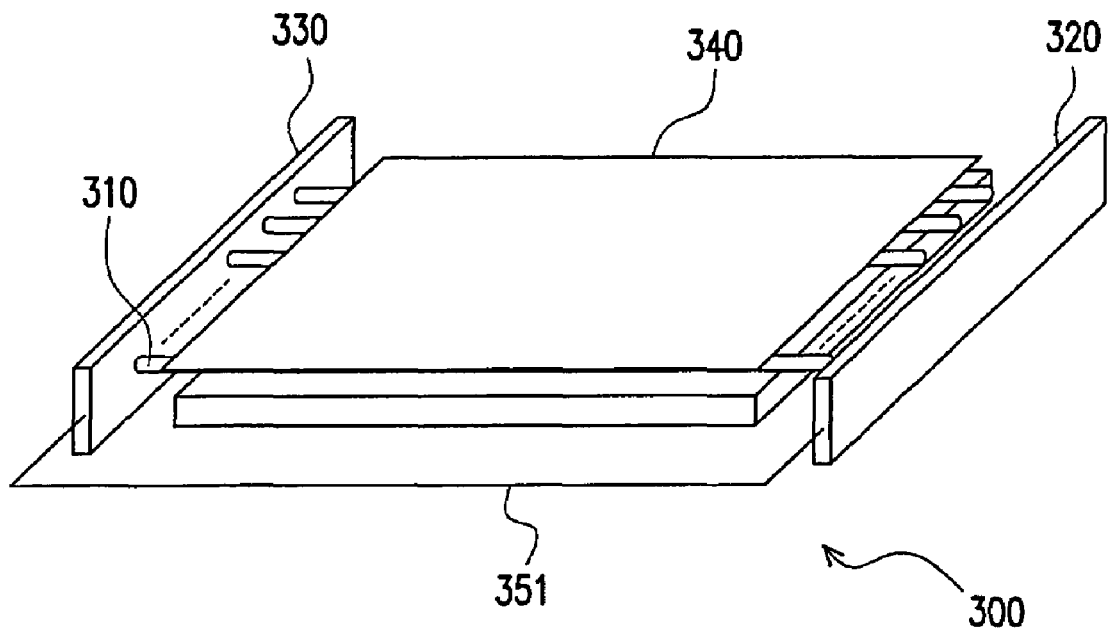
FIG. 3D is an exploded perspective view of the backlight module according to the first embodiment of the present invention.

FIG. 3D is an exploded, perspective view of the backlight module of the first embodiment of the present invention. The backlight module 300 of this embodiment further includes at least one optical film 340. The optical film 340 is disposed above the plurality of lamps 310 to enable the backlight module 300 to provide a more uniform power source. Specifically, the optical film 340 may be, but is not limited to, a combination of a prism sheet, a diffuser, a brightness enhancement film or other optical films that facilitate luminance uniformity of the power source.

Figure 4A:
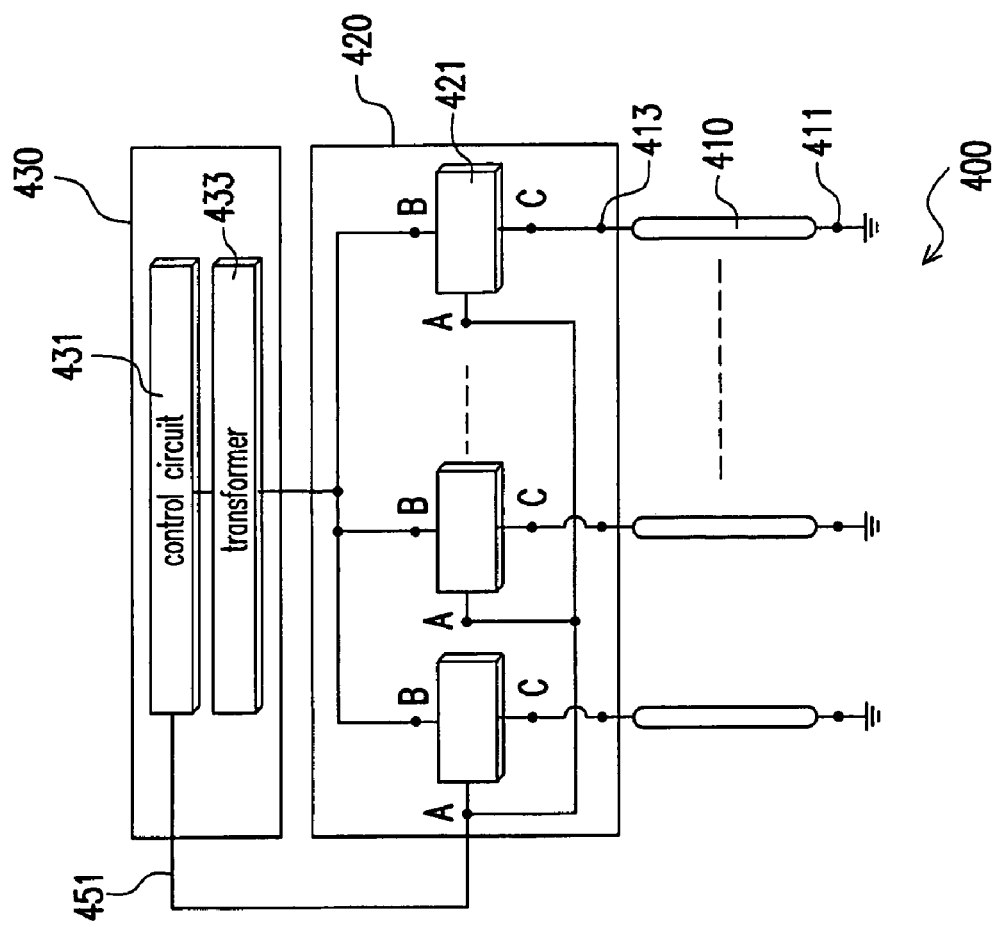
FIG. 4A and FIG. 4B are circuit diagrams of the backlight module of the first embodiment.
Figure 4B:
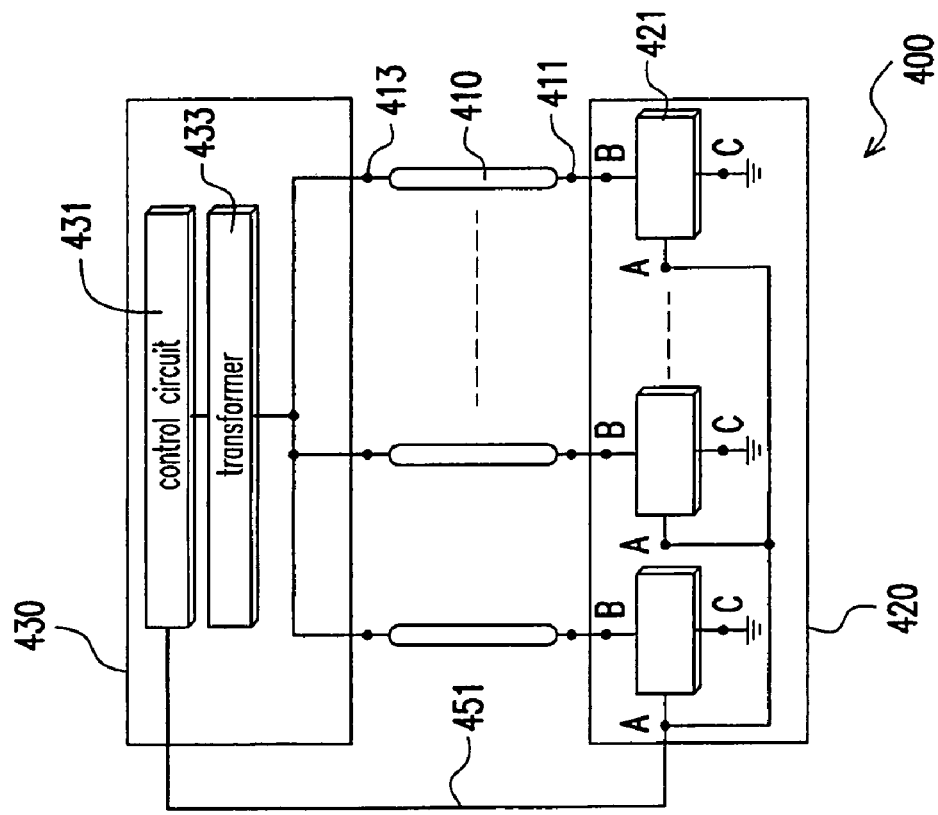

FIG. 4A and FIG. 4B are circuit diagrams of the backlight module according to the first embodiment of the present invention. In this embodiment, first electrodes 411 of lamps 410 are defined as low voltage ends, and second electrodes 413 of the lamps 410 are defined as high voltage ends.

FIG. 4A is a circuit diagram of the backlight module in which the first circuit board is disposed at the low voltage end of the lamp. Referring to FIG. 4A, the backlight module 400 of this embodiment includes a plurality of lamps 410, a first circuit board 420, a second circuit board 430 and a wire 451. The second circuit board 420 includes current adjustment devices 421, and the first circuit board 430 includes a control circuit 431 and a transformer 433. In addition, each current adjustment device 421 of the first circuit board 420 has three contacts A, B, C. The contact A is electrically coupled to the control circuit 431 of the second circuit board 430 through the wire 451, for receiving a signal outputted from the control circuit 431. The contact B is electrically coupled to the first electrode 411 of a corresponding lamp. The contact C is coupled to ground.

With continuous reference to FIG. 4A, the control circuit 431 of the second circuit board 430 may drive the transformer 433 to generate signals for driving the lamps 410. At the same time, the control circuit 431 of the second circuit board 430 may output a voltage signal to the current adjustment devices 421 of the first circuit board 420 through the wire 451 so that the current adjustment devices 421 are enabled to control the current of the lamps 410 and hence to adjust the luminance of the lamps 410.

FIG. 4B is a circuit diagram of the backlight module in which both the first circuit board 420 and the second circuit board 430 are disposed at the high voltage end. Referring to FIG. 4B, the contact A of each current adjustment device 421 is electrically coupled to the control circuit 431 of the second circuit board 430 through the wire 451. The contact B of each current adjustment device 421 is electrically coupled to the transformer 433 of the second circuit board 430. The contact C of each current adjustment device 421 is coupled to a corresponding second electrode 413. In addition, the first electrodes 411 of the lamps 410 are grounded.

With continuous reference to FIG. 4B, the control circuit 431 of the second circuit board 430 is used to drive the transformer 433 to generate signals outputted to the current adjustment devices 421 through the contacts B. At the same time, the control circuit 431 of the second circuit board 430 also provides a voltage signal outputted to the current adjustment devices 421 of the first circuit board 420 through the wire 451. Upon receiving the voltage signal provided by the control circuit 431, the current adjustment devices 421 outputs suitable voltage to the lamps 410 through the contacts C. As such, the current flowing through the lamps 410 is controlled by the current adjustment devices 421 to adjust the luminance of the lamps 410.

Second Embodiment

Figure 5:
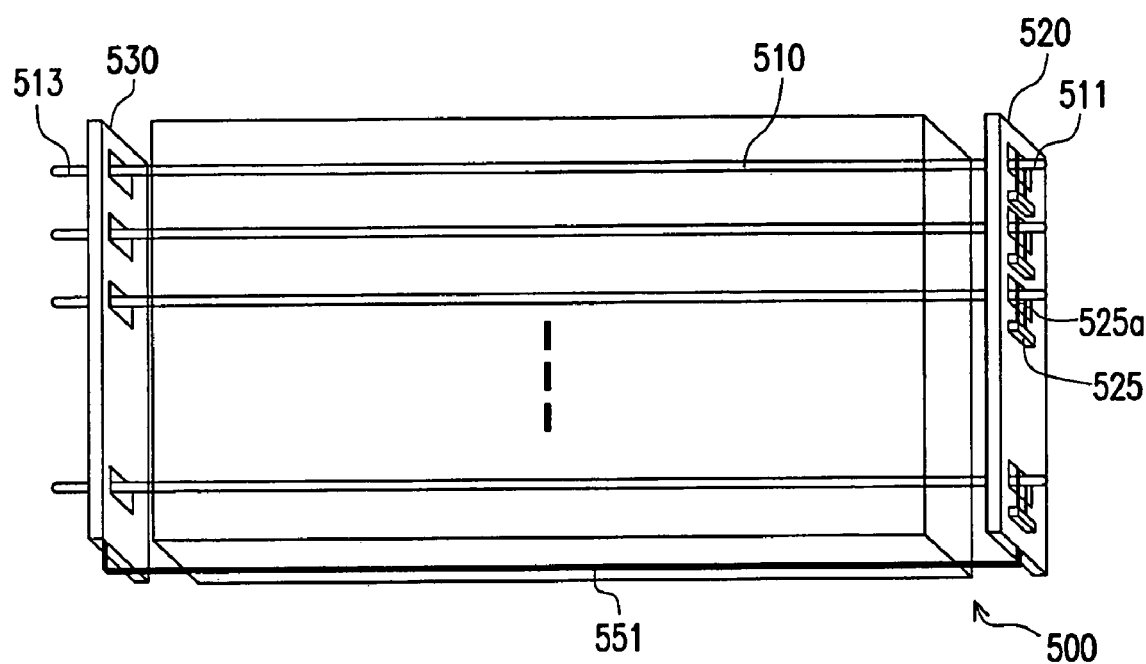
FIG. 5 is a perspective view of a backlight module in accordance with a second embodiment of the present invention.

FIG. 5 is a perspective view of a backlight module in accordance with a second embodiment of the present invention. This embodiment is substantially similar to the first embodiment, except that current adjustment devices 525 of the second embodiment each include a pair of clamping pins 525a for clamping first electrodes 511.

Referring to FIG. 5, the backlight module 500 of this embodiment includes a plurality of lamps 510, a first circuit board 520 and a second circuit board 530. Each lamp 510 includes a first electrode 511 and a second electrode 513. The first circuit board 520 includes a plurality of current adjustment devices 525 each having a pair of clamping pins 525a for clamping a corresponding first electrode 511. The second circuit board 530 is electrically coupled to the second electrodes 513, and is electrically coupled to the first circuit board 520 through a wire 551. In addition, the first circuit board 520 is disposed on one side (e.g., a right side) of the backlight module 500, and the second circuit board 530 is disposed on another side (e.g., a left side) of the backlight module 500.

Operation of the backlight module 500 is similar to that described in the first embodiment and, thus, is not repeated herein.

Furthermore, the current adjustment device 525 may, during packaging, reserve a pair of clamping pins 525a for clamping the first electrode 511 of the lamp 510. The package type of the current adjustment device 525 may be dual in-line package (DIP) type or surface mounted device (SMD) type.

Third Embodiment

This embodiment is substantially similar to the first embodiment, except that the current adjustment devices 325 of the first embodiment are disposed on the first circuit board 320, while current adjustment devices 637 of this embodiment are disposed on the second circuit board 630.

Figure 6A:
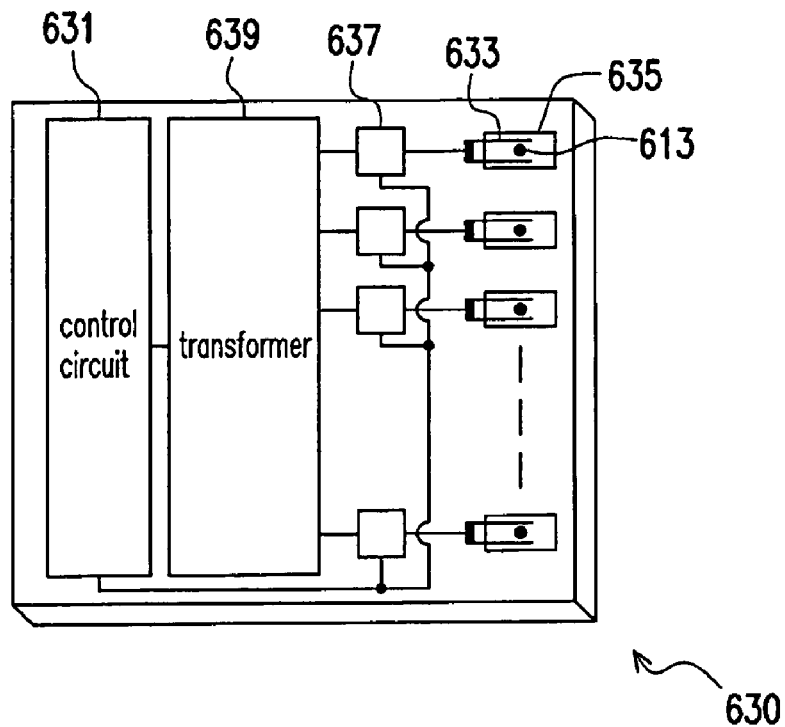
FIG. 6A and FIG. 6B illustrate the second circuit board of the third embodiment of the present invention.
Figure 6B:
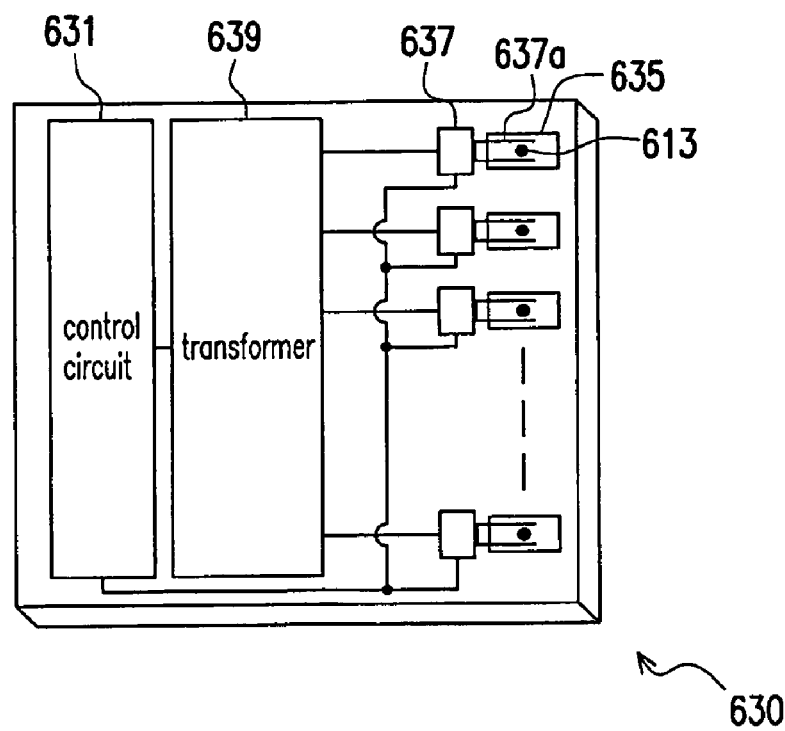

FIG. 6A and FIG. 6B illustrate the second circuit board of this embodiment. Referring to FIG. 6A, the second circuit board 630 of the embodiment includes a control circuit 631, second conductive clips 633, second openings 635, current adjustment devices 637 and at least one transformer 639. The current adjustment devices 637 are electrically coupled to the second electrodes 613 of the lamps through the second conductive clips 633.

Referring to FIG. 6B, the current adjustment device 637 may also directly clamp the second electrode 613 of the lamp 610 using at least one pair of clamping pins 637a of the current adjustment device 637 itself in stead of using the second conductive clips 633.

Fourth Embodiment

Since the circuit board may be disposed at any locations according to various size and mechanical design of the backlight module of the present invention, this embodiment further provides a circuit board with another configuration.

Figure 7A:
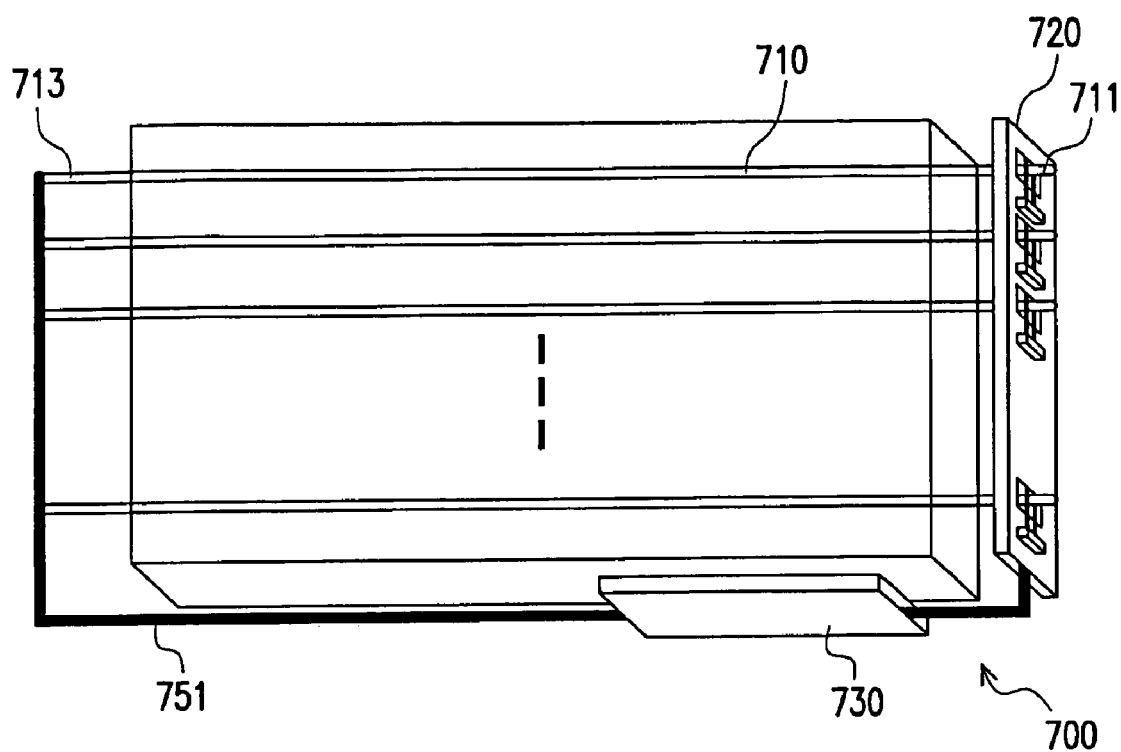
FIGS. 7A and 7B are perspective views of a backlight module in accordance with a fourth embodiment of the present invention.
Figure 7B:
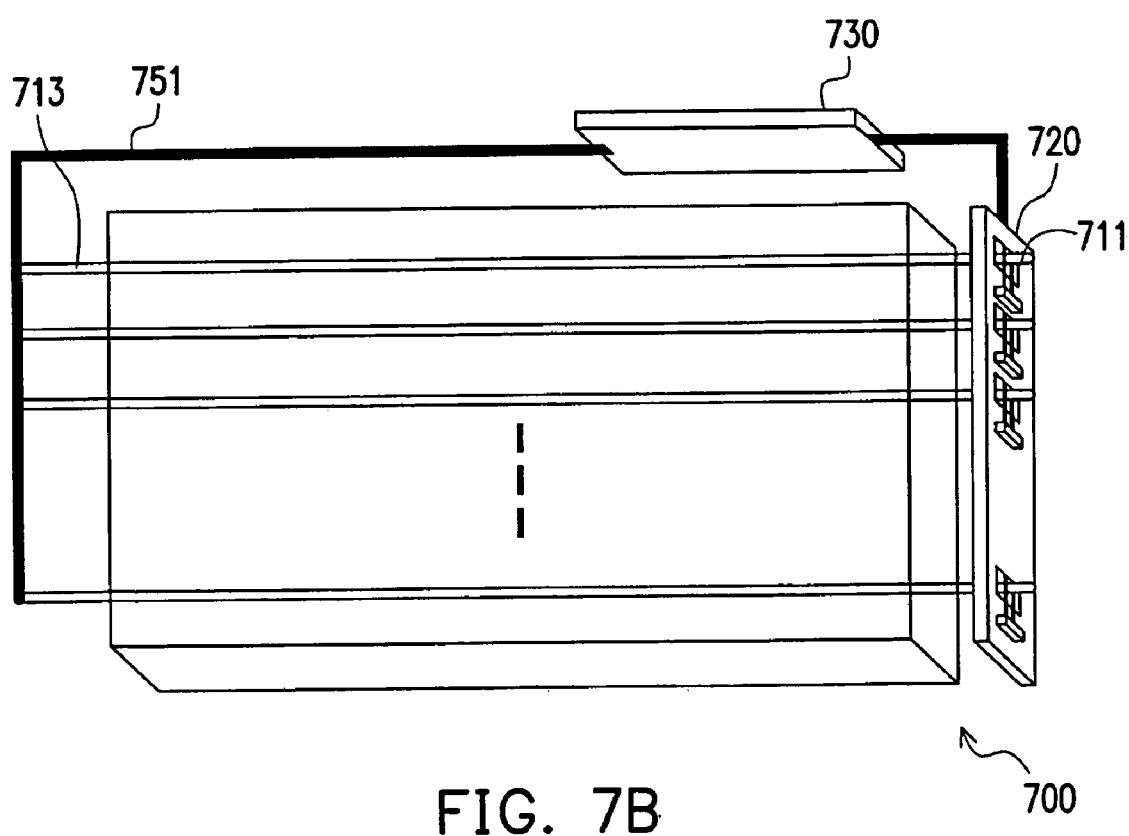

FIGS. 7A and 7B are perspective views of a backlight module in accordance with a fourth embodiment of the present invention. Referring to FIG. 7A, the backlight module 700 of this embodiment includes a plurality of lamps 710, a wire 751, a first circuit board 720 and a second circuit board 730. Each lamp 710 includes a first electrode 711 and a second electrode 713. The second circuit board 730 is disposed at any location on a bottom side of the backlight module 700, and is electrically coupled to the second electrodes 713 through the wire 751. In addition, the first circuit board 720 is disposed on one side (e.g., right or left side) of the lamps 710.

Referring to FIG. 7B, the second circuit board 730 of this embodiment may also be disposed at any location on a top side of the backlight module 700, and may be electrically coupled to the second electrodes 713 through the wire 751.

It should be understood that a third circuit board may be added into the construction described above and a third conductive clip may be included to hold the electrode of the lamp in order to enlarge the controllable scope of adjusting the current of the lamp and increase the stability of the lamp at the moment that the lamp is being ignited, as described below in detail with reference to FIG. 8.

Figure 8:
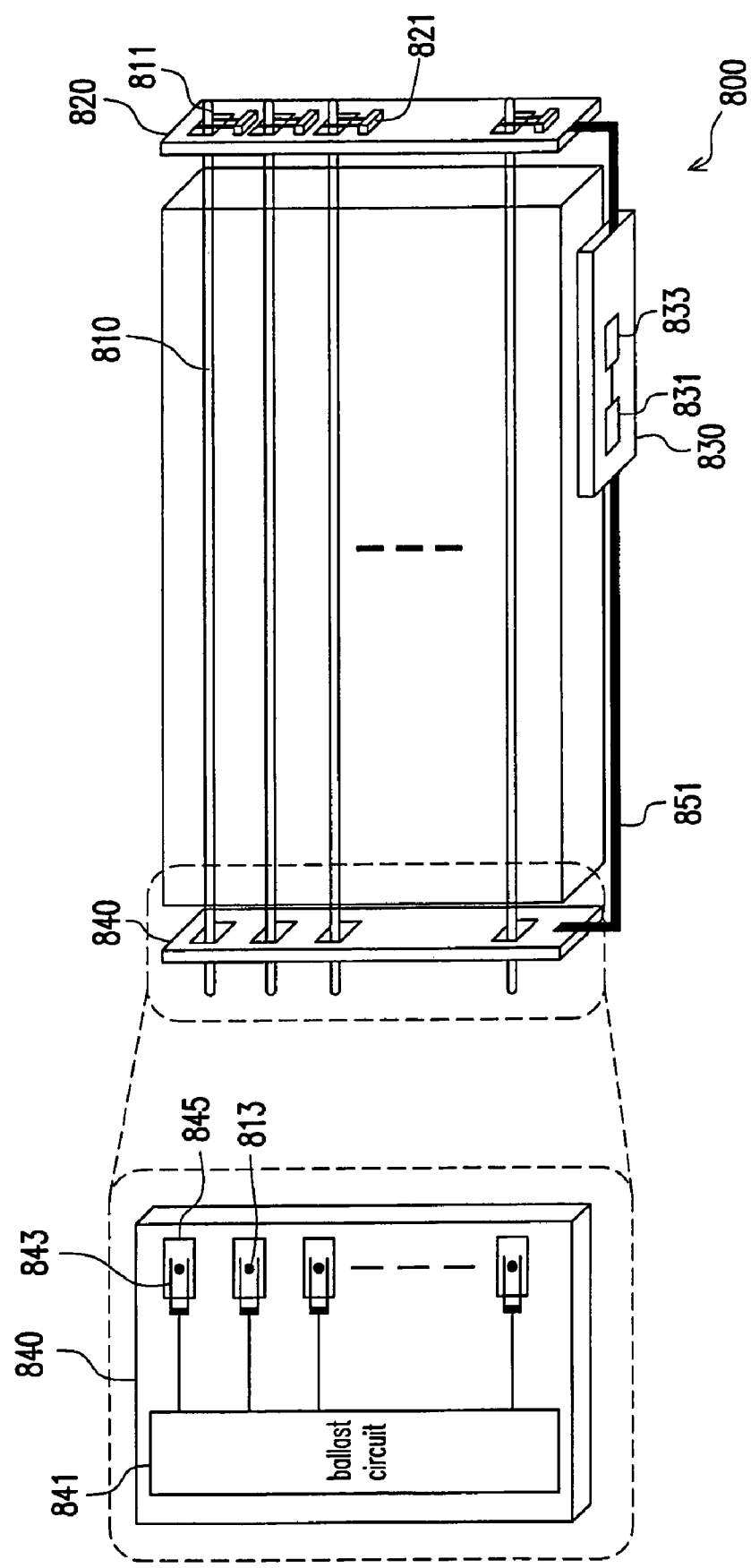
FIG. 8 illustrates a backlight module in which a third circuit board of FIG. 7A is further included.

FIG. 8 illustrates a backlight module of this embodiment in which a third circuit board is further included. Referring to FIG. 8, the backlight module 800 includes a first circuit board 820, a second circuit board 830, a third circuit board 840, a wire 851 and a plurality of lamps 810. Each lamp 810 includes a first electrode 811 and a second electrode 813. The second circuit board 830 is electrically coupled to the second electrodes 813 through the third circuit board 840 and the wire 851. As shown in FIG. 8, the second circuit board 830 includes a control circuit 831 and a transformer 833. In this embodiment, the second circuit board 830 is disposed on a bottom side of the backlight module 800 (the second circuit board 830 may also be disposed on a top side of the backlight module 800 according to various requirements). The third circuit board 840 may further include a plurality of third conductive clips 843 and a plurality of third openings 845. The second electrodes 813 extend through the third openings 845 to be clamped by the third conductive clips 843 of the third circuit board 840.

As described above, the control circuit 831 of the second circuit board 830 drives the transformer 833 to generate a voltage signal transmitted to the third circuit board 840 through the wire 851. As such, the voltage signal may be transmitted to the second electrodes 813 through the third conductive clips 843 to drive the lamps 810.

Specifically, the third circuit board 840 may further include a ballast circuit 840 to increase the transient impedance and stability of the lamps 810 at the moment that the lamps 810 are being ignited. The ballast circuit 841 on third circuit board 840 mainly includes a capacitor that may be formed by upper and lower electrodes printed on the circuit board, or may be formed by DIP type or SMD type packaging.

The third circuit board 840 and the first circuit board 820 may be disposed on two sides of the lamps 810 to be symmetrical with each other. In addition, instead of being disposed on the third circuit board 840, the ballast circuit 841 may also be disposed on the first circuit board 820 if desired, such that the ballast circuit 841 is directly connected in series with the current adjustment devices 821.

Furthermore, the backlight module of this embodiment may further include at least one optical film (not shown) disposed above the lamps, which can make the power source provided by the backlight module more uniform.

Fifth Embodiment

Figure 9A:
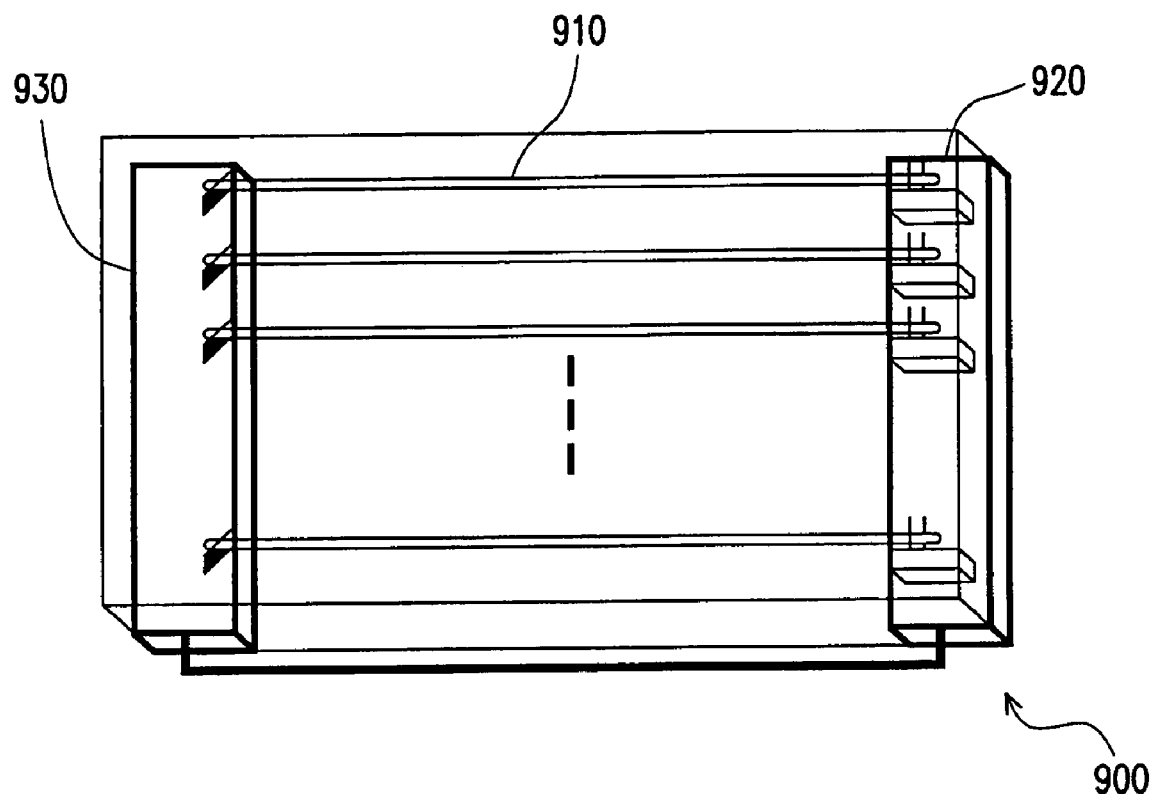
FIG. 9A illustrates a backlight module in accordance with a fifth embodiment of the present invention.
Figure 9B:
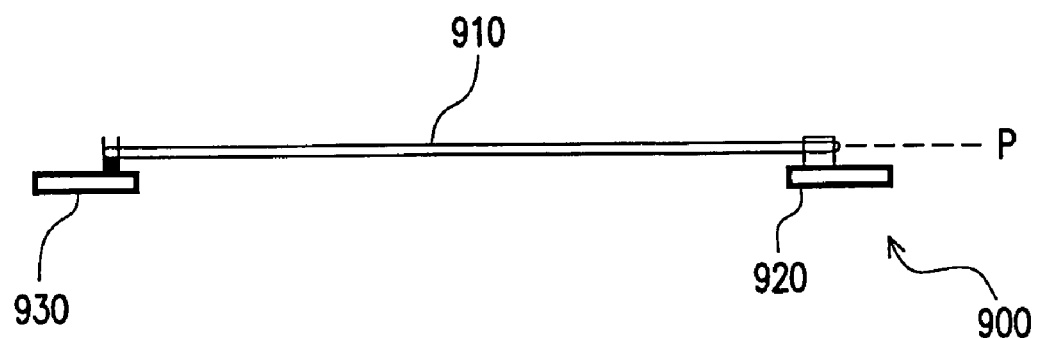
FIG. 9B is a side view of the backlight module of FIG. 9A.

FIG. 9A illustrates a backlight module in accordance with a fifth embodiment of the present invention, and FIG. 9B is a side view of the backlight module of this embodiment. Referring to FIG. 9A, the backlight module 900 of this embodiment includes a plurality of lamps 910, a first circuit board 920 and a second circuit board 930. As shown in FIG. 9B, the first circuit board 920 is disposed in substantially parallel with a plane P on which the lamps 910 are located, and the second circuit board 930 is also disposed in substantially parallel with the plane P. It should be understood that the arrangement of the first circuit board 920 and the second circuit board 930 in this embodiment facilitates reducing the overall thickness of the backlight module 900.

Sixth Embodiment

Figure 10A:
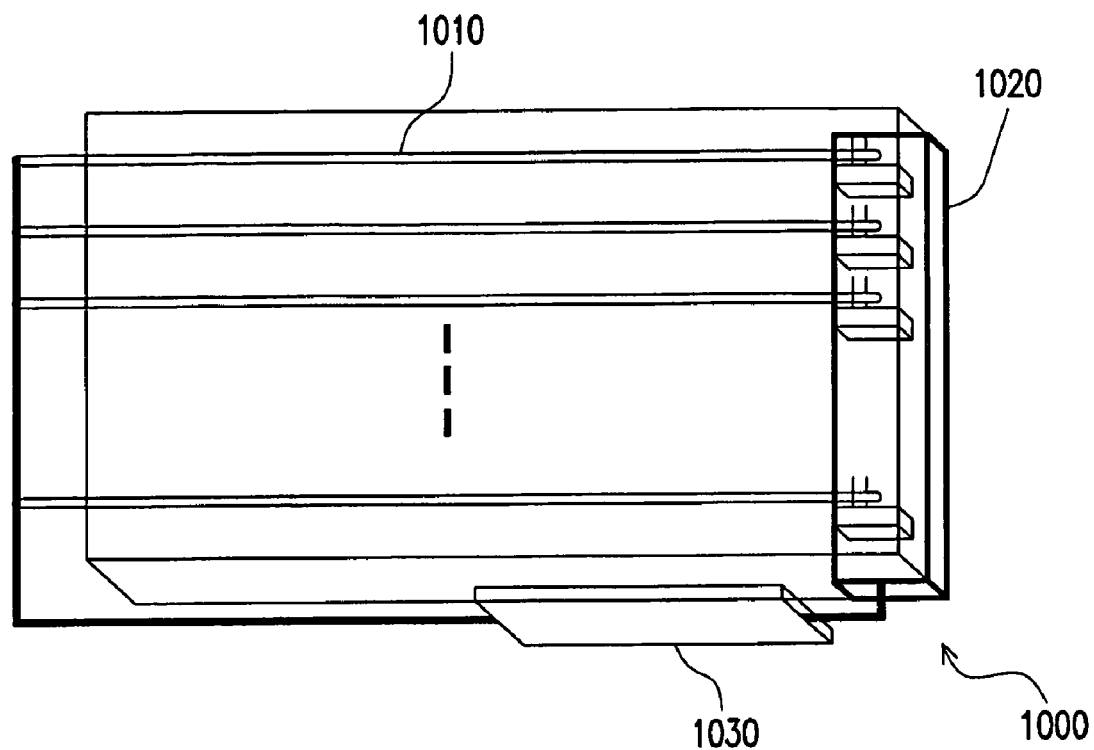
FIG. 10A illustrates a backlight module in accordance with a sixth embodiment of the present invention.
Figure 10B:
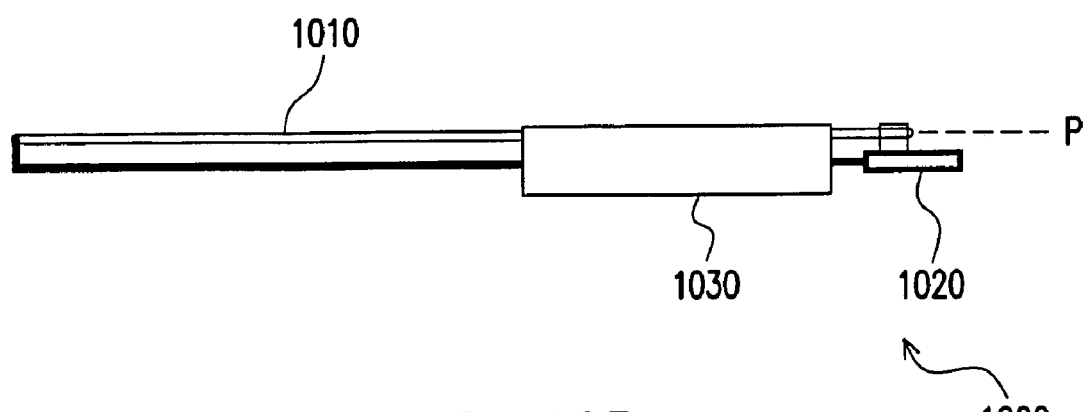
FIG. 10B is a side view of the backlight module of FIG. 10A.

FIG. 10A illustrates a backlight module in accordance with a sixth embodiment of the present invention, and FIG. 10B is a side view of the backlight module of this embodiment. Referring to FIG. 10A, the backlight module 1000 of this embodiment includes a plurality of lamps 1010, a first circuit board 1020 and a second circuit board 1030. As shown in FIG. 10B, the first circuit board 1020 is disposed in substantially parallel with a plane P on which the lamps 1010 are located. The second circuit board 1030 is disposed on a bottom side of the backlight module (may also be disposed on a top side of the backlight module). In addition, the first circuit board 1020 may also be disposed on one side (e.g., right or left side) of the lamps 1010. It should be understood that the arrangement of the first circuit board 1020 in this embodiment facilitates reducing the overall thickness of the backlight module 1000.

Seventh Embodiment

Figure 11A:
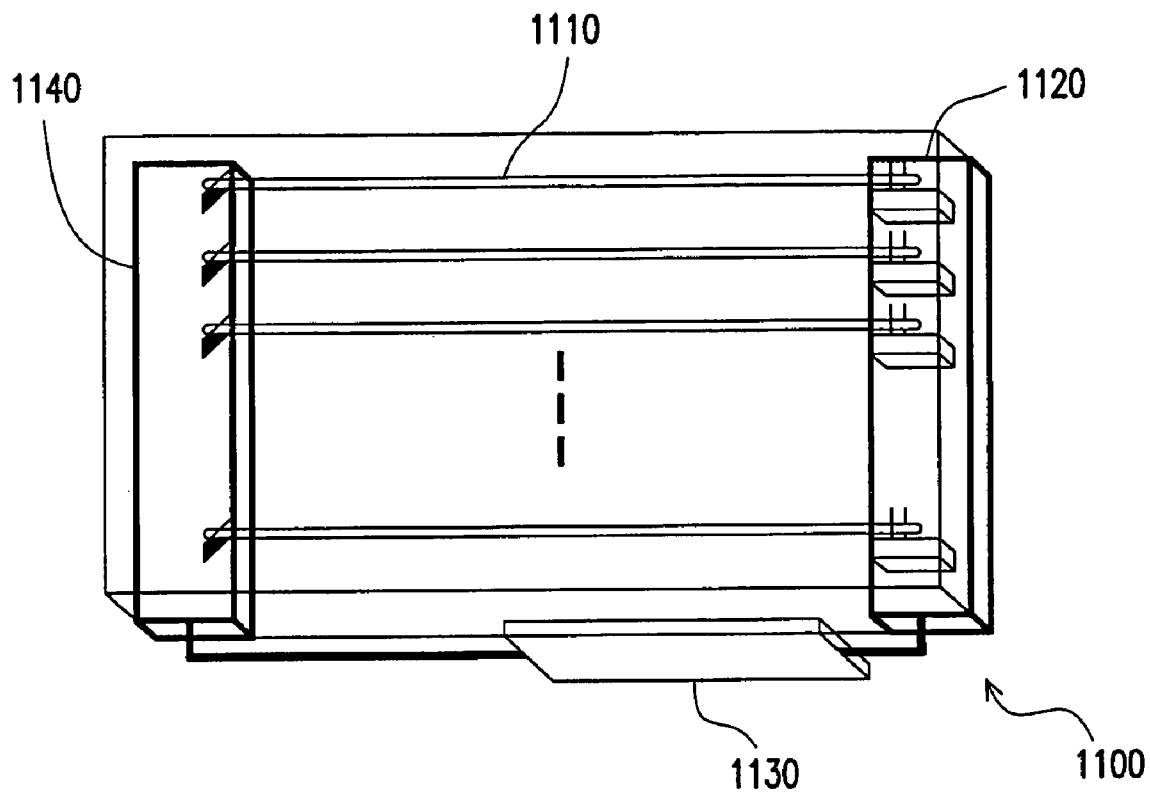
FIG. 11A illustrates a structure based on the backlight module of FIG. 10A, in which a third circuit board is further included.
Figure 11B:
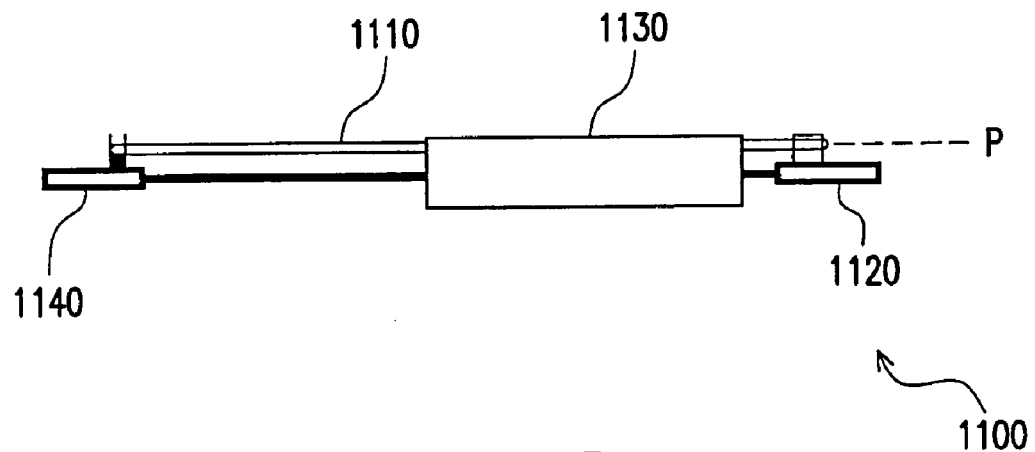
FIG. 11B is a side view of the backlight module of FIG. 11A.

FIG. 11A illustrates a backlight module based on the sixth embodiment, in which a third circuit board is further included, and FIG. 11B is a side view of the backlight module of this embodiment. Referring to FIG. 11A, the backlight module 1100 of this embodiment includes a plurality of lamps 1110, a first circuit board 1120, a second circuit board 1130 and a third circuit board 1140. As shown in FIG. 11B, the first circuit board 1120 is disposed in substantially parallel with a plane P on which the lamps 1110 are located, and the third circuit board 1130 is also disposed in substantially parallel with the plane P. The second circuit board 1130 is disposed on a top side of the backlight module (or disposed on a bottom side of the backlight module). In addition, the third circuit board 1140 and the first circuit board 1120 are arranged on two sides of the lamps 1110 to be symmetrical with each other. It should be understood that the arrangement of the first circuit board 1120 and the third circuit board 1140 in this embodiment facilitates reducing the overall thickness of the backlight module 1100.

In sum, the backlight module of the present invention has at least the following advantages:

1. In some embodiments of the present invention, the current adjustment devices of the lamps of the backlight module of may be integrated into the printed circuit board to adjust the current of the lamps and hence control luminance variations among the lamps, thereby improving the image quality of the liquid crystal displays in comparison with the conventional backlight module.

2. In the present invention, the conductive clips or clamping pins of the current adjustment devices are employed to clamp the electrodes of the lamps and, therefore, assembly of the lamps is relatively simple, thereby significantly reducing the assembly time. In addition, this construction may effectively increase the assembly yield rate and quality, and reduce the manufacturing cost.

3. In some embodiments of the present invention, the arrangement of the circuit board may effectively reduce the overall thickness of the backlight module, making the liquid crystal display lighter and thinner.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A backlight module, comprising:
   a plurality of lamps, each comprising a first electrode and a second electrode;
   a first circuit board comprising a plurality of first conductive clips clamping the first electrodes, wherein the first circuit board has a plurality of first openings, and the first electrodes clamped by the first conductive clips extend through the first openings; and
   a second circuit board electrically coupled to the second electrodes and the first circuit board.

2. The backlight module in accordance with claim 1, wherein the lamps extend in parallel with each other.

3. The backlight module in accordance with claim 1, wherein the lamps are cold cathode fluorescent lamps, hot cathode fluorescent lamps, or external electrode fluorescent lamps.

4. The backlight module in accordance with claim 1, further comprising a plurality of current adjustment devices, wherein the current adjustment devices are located on the first circuit board, and are electrically coupled to the first electrodes through the first conductive clips.

5. The backlight module in accordance with claim 4, wherein the first circuit board comprises a ballast circuit electrically coupled to the current adjustment devices.

6. The backlight module in accordance with claim 1, wherein the second circuit board comprises a plurality of second conductive clips clamping the second electrodes.

7. The backlight module in accordance with claim 6, wherein the second circuit board has a plurality of second openings, and the second electrodes clamped by the second conductive clips extend through the second openings.

8. The backlight module in accordance with claim 6, further comprising a plurality of current adjustment devices, wherein the current adjustment devices are located on the second circuit board, and are electrically coupled to the second electrodes through the second conductive clips.

9. The backlight module in accordance with claim 1, further comprising a plurality of current adjustment devices, wherein the current adjustment devices are located on the second circuit board, and are electrically coupled to the second electrodes.

10. The backlight module in accordance with claim 9, wherein each of the current adjustment devices comprises at least one pair of clamping pins configured to clamp one of the second electrodes correspondingly.

11. The backlight module in accordance with claim 1, further comprising a wire, wherein the second circuit board is electrically coupled to the second electrodes through the wire.

12. The backlight module in accordance with claim 1, further comprising:
   a third circuit board; and a wire, wherein the second circuit board is electrically coupled to the second electrodes through the third circuit board and the wire.

13. The backlight module in accordance with claim 12, wherein the third circuit board is positioned to be substantially perpendicular or substantially parallel to a plane on which the lamps are located.

14. The backlight module in accordance with claim 12, wherein the third circuit board comprises a ballast circuit.

15. The backlight module in accordance with claim 12, wherein the third circuit board comprises a plurality of third conductive clips clamping the second electrodes.

16. The backlight module in accordance with claim 1, wherein the first circuit board is positioned to be substantially perpendicular or substantially parallel to a plane on which the lamps are located.

17. The backlight module in accordance with claim 1, wherein the second circuit board is positioned to be substantially perpendicular or substantially parallel to a plane on which the lamps are located.

18. The backlight module in accordance with claim 1, further comprising an optical film located above the lamps.

19. A backlight module, comprising:
   a plurality of lamps, each comprising a first electrode and a second electrode;
   a first circuit board comprising a plurality of current adjustment devices, each of the current adjustment devices having at least one pair of clamping pins configured to clamp one of the first electrodes correspondingly, wherein the first circuit board has a plurality of first openings, and the first electrodes clamped by the clamping pins extend through the first openings; and
   a second circuit board electrically coupled to the second electrodes and the first circuit board.

20. The backlight module in accordance with claim 19, wherein the lamps extend in parallel with each other.

21. The backlight module in accordance with claim 19, wherein the lamps are cold cathode fluorescent lamps, hot cathode fluorescent lamps or external electrode fluorescent lamps.

22. The backlight module in accordance with claim 19, wherein the second circuit board comprises a plurality of second conductive clips clamping the second electrodes.

23. The backlight module in accordance with claim 22, wherein the second circuit board has a plurality of second openings, and the second electrodes clamped by the second conductive clips extend through the second openings.

24. The backlight module in accordance with claim 19, further comprising a wire, wherein the second circuit board is electrically coupled to the second electrodes through the wire.

25. The backlight module in accordance with claim 19, further comprising:
   a third circuit board; and
   a wire, wherein the second circuit board is electrically coupled to the second electrodes through the third circuit board and the wire.

26. The backlight module in accordance with claim 25, wherein the third circuit board comprises a ballast circuit.

27. The backlight module in accordance with claim 25, wherein the third circuit board comprises a plurality of third conductive clips clamping the second electrodes.

28. The backlight module in accordance with claim 25, wherein the third circuit board is positioned to be substantially perpendicular or substantially parallel to a plane on which the lamps are located.

29. The backlight module in accordance with claim 19, wherein the first circuit board is positioned to be substantially perpendicular or substantially parallel to a plane on which the lamps are located.

30. The backlight module in accordance with claim 19, wherein the second circuit board is positioned to be substantially perpendicular or substantially parallel to a plane on which the lamps are located.

31. The backlight module in accordance with claim 19, further comprising an optical film located above the lamps.

32. The backlight module in accordance with claim 19, wherein the first circuit board comprises a ballast circuit electrically coupled to the current adjustment devices.

* * * * *